(12) United States Patent
Solntseva

(10) Patent No.: US 9,087,046 B2
(45) Date of Patent: Jul. 21, 2015

(54) SWIPING ACTION FOR DISPLAYING A TRANSLATION OF A TEXTUAL IMAGE

(71) Applicant: ABBYY Software Ltd., Nicosia (CY)

(72) Inventor: Ekaterina Solntseva, Moscow (RU)

(73) Assignee: ABBYY Development LLC (RU)

( * ) Notice: Subject to any disclaimer, the term of this patent is extended or adjusted under 35 U.S.C. 154(b) by 325 days.

(21) Appl. No.: 13/694,900

(22) Filed: Sep. 18, 2012

(65) Prior Publication Data

US 2014/0081620 A1    Mar. 20, 2014

(51) Int. Cl.
  *G06F 17/28* (2006.01)
  *G06F 3/041* (2006.01)
  *G06F 3/0488* (2013.01)

(52) U.S. Cl.
  CPC ............ *G06F 17/28* (2013.01); *G06F 3/04883* (2013.01); *G06F 17/289* (2013.01)

(58) Field of Classification Search
  CPC ........................... G06F 17/289; G06F 17/2836
  USPC ............................................................... 704/3
  See application file for complete search history.

(56) References Cited

U.S. PATENT DOCUMENTS

| | | | | |
|---|---|---|---|---|
| 6,049,328 A * | 4/2000 | Vanderheiden | ................ | 345/173 |
| 6,115,482 A * | 9/2000 | Sears et al. | ..................... | 382/114 |
| 7,505,627 B2 * | 3/2009 | Chang et al. | ................... | 382/181 |
| 7,974,832 B2 * | 7/2011 | Furuuchi et al. | ................... | 704/7 |
| 8,214,768 B2 * | 7/2012 | Boule et al. | ..................... | 715/863 |
| 8,239,183 B2 * | 8/2012 | Sembower | ....................... | 704/2 |
| 8,312,032 B2 * | 11/2012 | Choi et al. | ..................... | 707/758 |
| 8,315,850 B2 * | 11/2012 | Furuuchi et al. | ................... | 704/7 |
| 8,364,464 B2 * | 1/2013 | Elgazzar et al. | ................... | 704/2 |
| 8,471,824 B2 * | 6/2013 | Kim et al. | ...................... | 345/173 |
| 8,862,456 B2 * | 10/2014 | Krack et al. | ..................... | 704/2 |
| 8,954,314 B2 * | 2/2015 | Powalowski | ...................... | 704/3 |
| 2003/0200078 A1 * | 10/2003 | Luo et al. | .......................... | 704/2 |
| 2005/0197825 A1 * | 9/2005 | Hagerman et al. | ................ | 704/2 |
| 2005/0267734 A1 * | 12/2005 | Masuyama | ........................ | 704/2 |
| 2006/0173829 A1 * | 8/2006 | Neeman | ............................. | 707/3 |
| 2006/0245005 A1 * | 11/2006 | Hall et al. | ....................... | 358/448 |
| 2008/0119236 A1 | 5/2008 | Chen et al. | | |
| 2008/0233980 A1 * | 9/2008 | Englund et al. | ................ | 455/466 |
| 2010/0008582 A1 * | 1/2010 | Kim et al. | ........................ | 382/177 |
| 2010/0048241 A1 | 2/2010 | Seguin et al. | | |
| 2010/0204979 A1 * | 8/2010 | Chiu et al. | ......................... | 704/3 |
| 2011/0010162 A1 * | 1/2011 | Elgazzar et al. | ................... | 704/2 |
| 2011/0167350 A1 * | 7/2011 | Hoellwarth | .................... | 715/727 |
| 2012/0001934 A1 | 1/2012 | Bala et al. | | |
| 2012/0030566 A1 | 2/2012 | Victor | | |

(Continued)

FOREIGN PATENT DOCUMENTS

WO     WO2009002787 A3    12/2008

*Primary Examiner* — Matthew Baker
(74) *Attorney, Agent, or Firm* — LeighAnn Weiland; Veronica Weinstein

(57) ABSTRACT

Disclosed is a method that involves acquiring an image with text, displaying all or a portion of the image on an electronic device. In response to detecting a swiping action or gesture, displaying a result of translation on a screen of the device. A first screen or display becomes a second one. Original text in a first language or source language may be easily and quickly compared to translated text shown on a second screen through a swiping gesture. Electronic dictionaries and machine translation may be used. These services may be independently stored and operated from different locations including on the device performing the translation, on a server or across a network (LAN, WAN, etc.). Optional manual correction of the translated text is also possible.

27 Claims, 6 Drawing Sheets

(56) References Cited

U.S. PATENT DOCUMENTS

| | | |
|---|---|---|
| 2012/0068937 A1* | 3/2012 | Backlund et al. ............. 345/173 |
| 2012/0109632 A1* | 5/2012 | Sugiura et al. .................... 704/3 |
| 2012/0245922 A1* | 9/2012 | Kozlova et al. ................... 704/3 |
| 2013/0103383 A1* | 4/2013 | Du et al. ............................ 704/3 |
| 2013/0231914 A1* | 9/2013 | Powalowski ...................... 704/3 |
| 2013/0285930 A1* | 10/2013 | Thorsander et al. .......... 345/173 |
| 2014/0180670 A1* | 6/2014 | Osipova ............................ 704/3 |
| 2014/0215329 A1* | 7/2014 | Zilberman et al. ............ 715/702 |
| 2014/0222413 A1* | 8/2014 | Rossmann ........................ 704/3 |

\* cited by examiner

SWIPING ACTION FOR DISPLAYING A TRANSLATION OF A TEXTUAL IMAGE

BACKGROUND OF THE INVENTION

1. Field

Embodiments of the invention generally relate to the field of automated translation using electronic dictionaries and various applications in such areas as machine translation.

2. Related Art

There is a lot of electronic devices with display screens capable of displaying text, including devices with a touch screen, for example many mobile devices, such as smartphones, mobile phones, laptops, tablet computers, netbooks, personal digital assistants (PDAs), e-book readers, photo and video cameras.

These devices have enough resources for using electronic dictionaries, which may be installed locally. Machine translation system may be available over the Internet, WiFi, Bluetooth, and through these and other types of networks and protocols.

Many of the aforesaid devices involve advanced displays and associated logic capable of supporting non-keyboard type input methods. For example the devices may support pen-based input, voice-based input or touch-based input.

Also, most of above-identified electronic devices may involve the use of a camera and other components to facilitate receiving, capturing and using photographs and images with text.

SUMMARY

In one embodiment, the invention provides a method including receiving an image with text (photos, PDF, Word files, pictures, etc.) with text to be translated on the screen of electronic device, automated translation of the text, displaying the result of translation on the screen of electronic device, providing a user an opportunity to swipe or refresh screens and compare the original text with the translated one. Some or all of the screens of the electronic device is swapped or refreshed upon the device receiving a swiping action.

Electronic dictionaries may comprise a software program, software logic which operate with dictionary data. The software program may include a shell, which provides a graphical user interface, morphology models to display inflected forms, a context search that uses an index, a teaching module, etc. The dictionaries that the user needs to use may be independently stored in different locations including the computer device or a server in a local area network (LAN) or a wide area network (WAN) such as the Internet.

An electronic device may also connect to a machine translation system. The machine translation system may be located on a remote server, access to which is available via a network connection or protocol to the server, e.g. over the Internet.

DETAILED DESCRIPTION

Figure 1A:
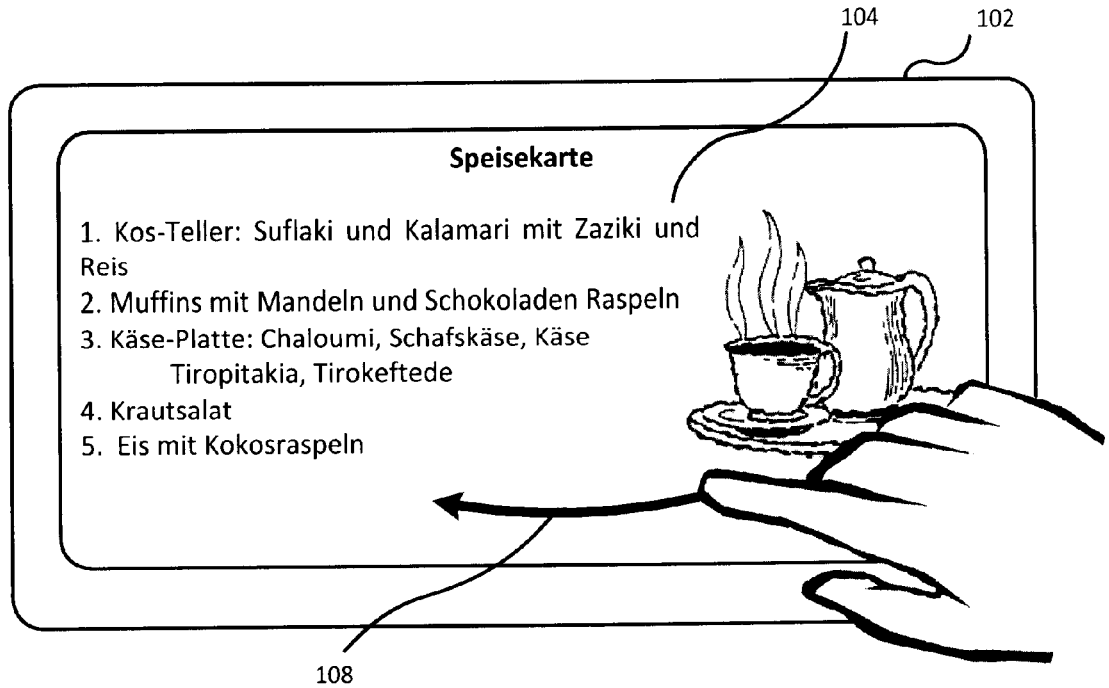
FIG. 1A shows an example of a user interface displayed on a touch screen of an electronic device with German text to be translated with dictionary into another language.

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The instances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Advantageously, the present invention discloses an electronic device that allows a user to perform machine or dictionary translation of an image or photograph containing text, display the translated variant of the image on another screen of an electronic or mobile device, and to switch between screens by performing a swiping gesture. The terms "screen" and "another screen" imply different views or representations on a physical screen or parts of a same physical screen and refer to a representation of an original image and a translated one. The electronic device preferably includes or accesses additional optical character recognition (OCR) software, firmware, algorithms or functionality to support translation of text. Such OCR software can identify the regions on the image where the text is located and then converts the image in the regions into a text format. OCR software may be installed at any remote server and run via the Internet, Bluetooth, etc. so that an OCR functionality need not be limited to steps or algorithms performed on the device that displays, captures or accesses an image of text.

The method(s) allow a user to correct results of an OCR function, an OCR result, and to re-initiate a translation of the original text, or portions of the original text such as based upon a correction made by a user. For example, a user may change a word recognized as "mike" to "make" to enable a correct translation of the word in the image into a second or target language.

Additionally, the disclosed methods also allow a user to compare the result of a machine and/or dictionary translation of the text (in a second or target language) with the text in a first or original (source) language. The methods may include the alternating use of a forward and backward swiping motion or action to a touch sensitive screen or in relation to a touch sensitive screen. The forward and backward swiping action may be, for example, respectively, a left swiping motion and a right swiping motion, or an upward and downward swiping motion, or by a counter-clockwise and clockwise rotation of a device etc.

The methods also allow a user to look through alternatives of translation and to optionally and manually make word-by-word correction of the text by insertion or replacement of a first translation with another variant of translation. The opportunity to manually correct the translated text (in the target language) is useful in the case when a user is not satisfied with the translation proposed by system translation or when a word is not translated due to text that was not accurately recognized.

A manual correction of the target language comprises, for example, touching a user interface element associated with a certain word or word combination in the translated text in an output language, displaying a list of alternative variants of translation for the source word or word combination (e.g., in a balloon or in a pop-up or overlay window), allowing a user to look through, find or enter other possible variants of translation of the word or word combination, receiving an input from a user that indicates a variant of translation, and performing an insertion or substitution of an appropriate variant of translation in the text instead of the variant originally or first proposed by the translation system.

In alternative embodiment, a subsequent translation from a target language back to a first (source) language may be made to allow a user to verify that the translation to the target language carries the correct meaning or sense. Such subsequent translation may be made by using a distinctive and different motion or swiping action in relation to the touch-sensitive screen. Only a portion of the translated text may be re-translated to a source language. Such portion may be indicated by a different swiping action (e.g., two-finger action, three-finger action), or by selecting a portion of text, and then subsequently making a swiping motion in a backward orientation or motion.

A system user can preliminarily select or "pre-set" a mode of translation (dictionary translation mode, machine translation mode, etc.), for example depending on the kind of text or accessibility of an Internet or cellular telephone connection. In one exemplary embodiment, two modes of translation are available: a dictionary translation and a machine translation. Dictionary translation performs a word-by-word or phrase-by-phrase translation based on translation of words and word combinations available in one or more dictionaries. A machine translation performs a sentence-by-sentence or phrase-by-phrase translation of the source text. In other embodiments, other modes of translation may be available including various services of machine and automated translation.

Figure 1B:
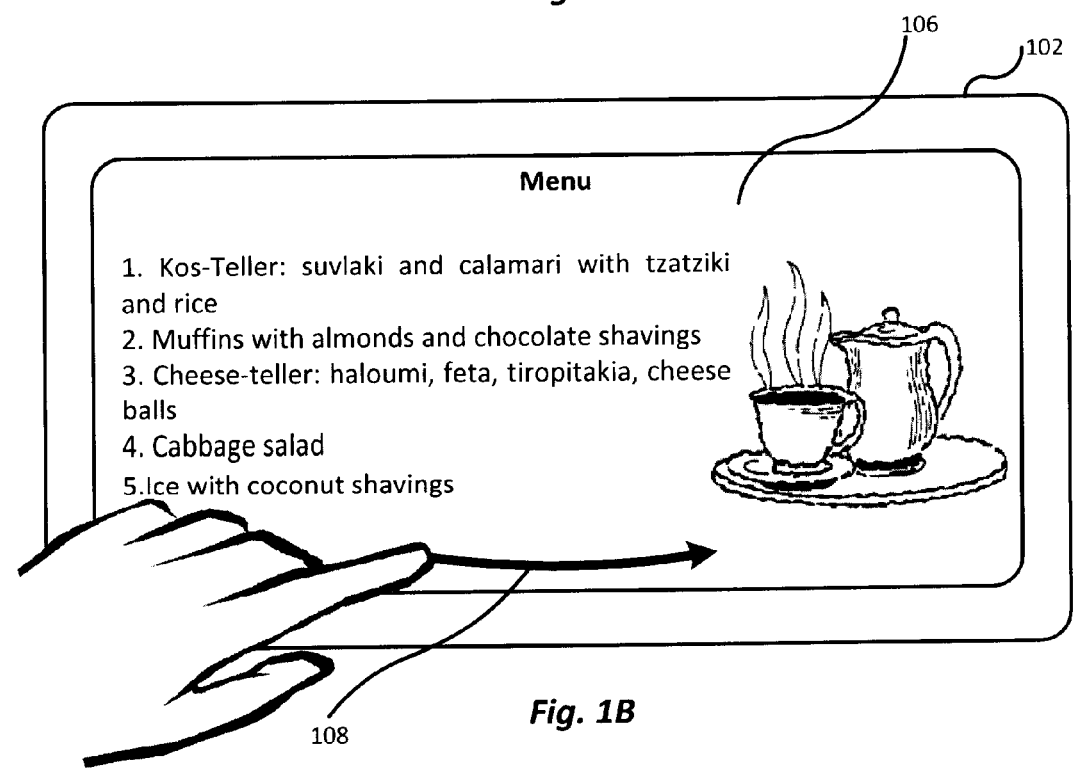
FIG. 1B shows an accurate English translation of the text shown in FIG. 1A on the screen switched by a swiping gesture.

Word-by-word dictionary translation may be selected in a case when text is represented as a string of grammatically unconnected words, for example a menu or a set of ingredients in a food recipe. The choice of dictionary translation allows one to save memory and resources of an electronic or mobile device. An example of a text image translated under a dictionary mode is shown in FIG. 1A and FIG. 1B. An image with German text appears in FIG. 1A and an accurate translation of the text appears in FIG. 1B.

In alternative embodiment, a pulling of a portion of the visible language down (off the screen) and then raising it back upward (without lifting the finger from the surface of the device display) translates only those lines or portions of text that were temporarily moved off the screen. Thereby a portion of the text in the image displayed or rendered (by being in a state of encoded text) to be translated may be selected. For example, if three lines of text from a menu were pulled off the screen, only those three lines are translated. Similarly, in another exemplary embodiment, when two top lines are swiped upward and off the screen, these two lines are translated when the screen is brought up and down through a combination of a swiping motion upward followed directly by a swiping motion downward.

In yet another alternative implementation, with reference to FIG. 1A, a translation is not performed until a swiping motion 108 is performed on the touch screen, touch pad, or through some other input device. If a sufficiently long swiping motion is made, the image (or encoded text) shown on the display or screen is moved off the side of the display, and the display is refreshed with a translation of the text. In another alternative embodiment, a translation may be made through a particular or separate software application, or a modification may be made to the operating system such that a translation through a swiping motion may be accomplished through any software application. For example, a swiping motion, when used in the context of a SMS texting program, translates text from a first or source language to a second or target language. The swiping motion may be performed on a message-by-message basis, on the basis of an entire screen of text, or on the basis of some or all of a history or thread of conversation (based on a configuration setting of the SMS texting program).

In another alternative embodiment, the translation of the source text into two target languages may be performed—either sequentially or at the same time, depending on a configuration setting. In this scenario, in the system, two target languages should be preliminary specified. A first swiping gesture in a forward direction initiates a translation into the first target language, and following after the first swiping gesture, a second swiping gesture in a forward direction initiates a second translation into the second target language. So, if user speaks or is familiar with two or more foreign languages, for example Spanish and German languages, a user can translate the source text into two languages based on this procedure. The desired target languages should be specified in the settings of the system or software application. In the example, the first swiping of the screen in a forward direction yields the result of the first translation into Spanish, and the second swiping in the forward direction shows the result of translation of the original (source) text into German. The swiping action makes translation between languages much easier than previously available. Instead of a user searching in a menu for a setting for a target language, a swiping motion allows a user to translate a text between two or more languages with a single gesture. Also, the opportunity to go back a previous screen by using a swiping gesture in a backward direction remains for a user. This process is available for translation of the source text into more than two target languages.

Advantageously, the method of translation with the help of translation and other types of dictionaries is most convenient in the circumstance where a device is without Internet access or when the Internet connection costs too much. Dictionaries may be installed locally on the electronic device.

On the contrary, machine translation is more reasonable to use in a case when a text to be translated includes sentences or words with linguistic and grammatical links between them.

Figure 1C:
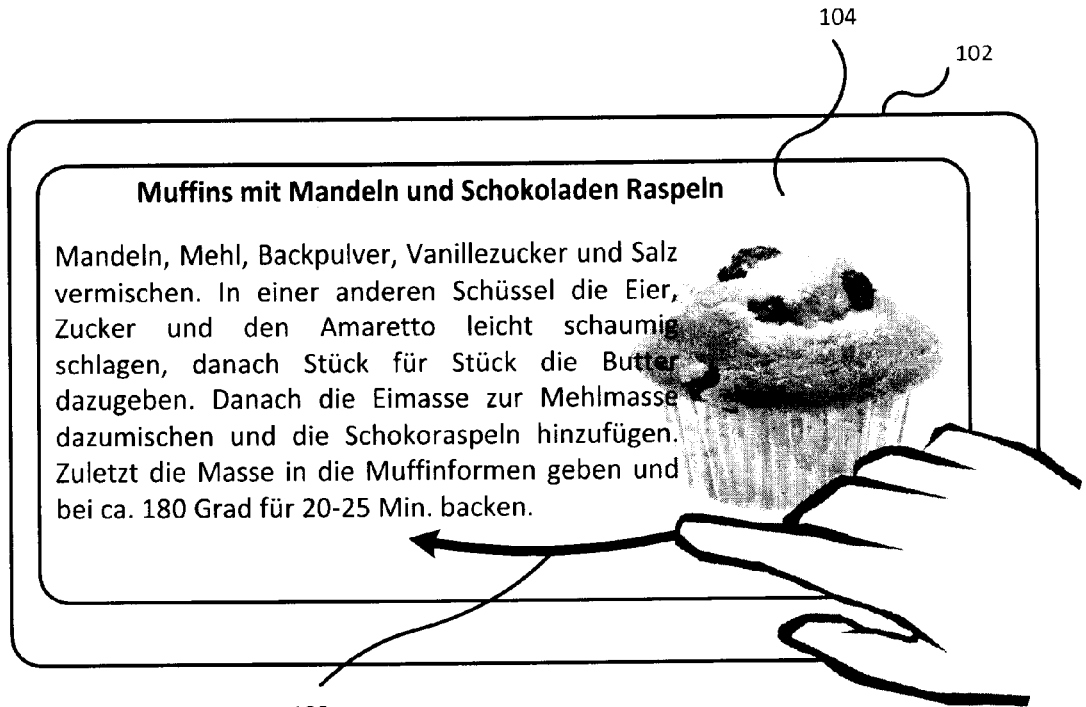
FIG. 1C shows another example of a user interface displayed on a touch screen of an electronic device with German text to be translated into another language through a machine translation system, etc.
Figure 1D:
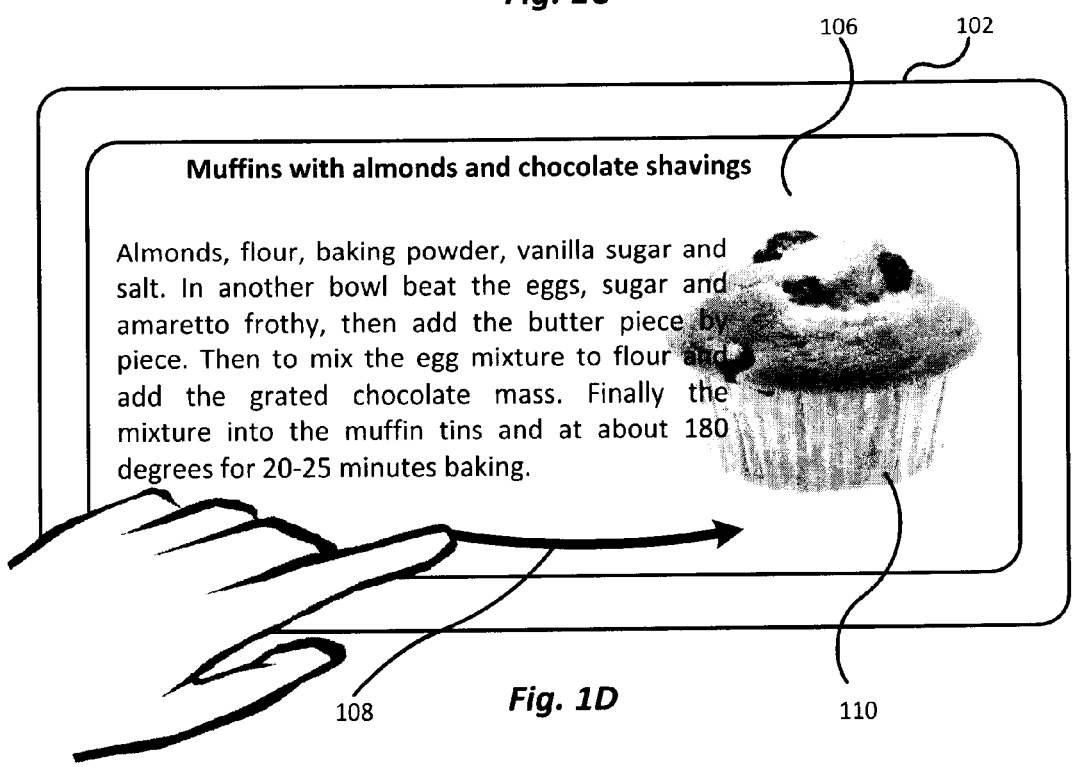
FIG. 1D shows an accurate English translation of the text shown in FIG. 1C switched by a swiping gesture.

An example of a text image translated under the direction of a machine translator is shown in FIG. 1C and FIG. 1D.

In one embodiment, a method of translating a sentence from one source language into another output or target language includes analyzing the source sentence using linguistic descriptions of the source language, constructing a language-independent semantic structure to represent the meaning of the source sentence, and generating an output sentence to represent the meaning of the source sentence in the output language using linguistic descriptions of the output language.

FIG. 1A shows an example of an electronic device 102 comprising a display screen 104. The content presented on the display screen or touch screen 104 may be outputted or rendered to the display by any application (e.g. an image-viewer, a pdf-viewer, e-book reader, a Web Browser, e-mail, Word, Notepad, a textual message) that sends an image of text to the display screen 104.

Figure 5:
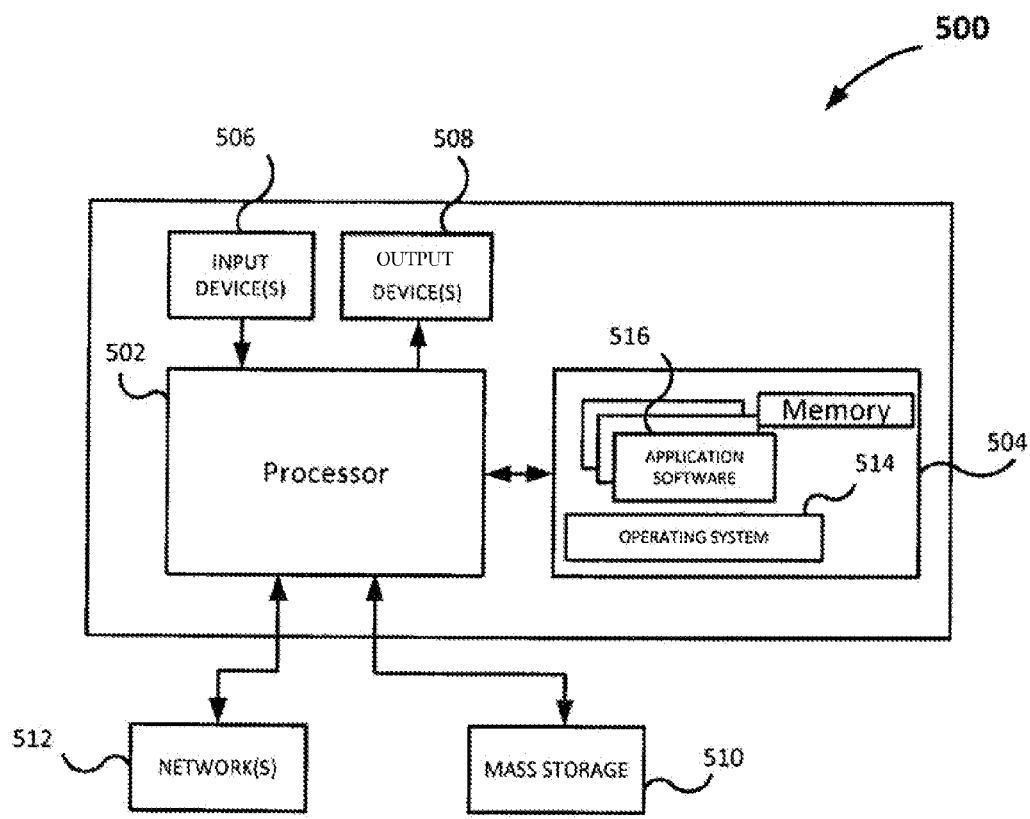
FIG. 5 shows an exemplary hardware for implementing the technology of the present disclosure.

The electronic device 102 may comprise a general purpose computer embodied in different configurations such as a smartphone, cell phone, digital camera, desktop personal computer (PC), laptop computer, or any other gadget and having touch screen as a display screen. FIG. 5 of the drawings shows exemplary hardware for implementing the user electronic device 102, in accordance with one embodiment.

The electronic device 102 may be provisioned with software that includes a dictionary application to implement techniques disclosed herein. The application may include one or more local dictionaries. Additionally, the application may be able to access one or more remote dictionaries located on a remote server via a network connection to a server (not shown).

The electronic device 102 may be also provisioned with software that performs machine translation or a machine translation system may be located on a remote server and run via network connection to the server, for example a Model-Based MT system, such as one disclosed in U.S. Pat. Nos. 8,195,447 and 8,214,199. In a preferred implementation, the system provides syntactically coherent output. Syntactic and morphological descriptions of the input and output languages are used for this purpose. The teachings of these patents are incorporated by reference to the extent necessary to enable the instant invention.

Referring to FIG. 1C, a touch screen 104 of an electronic device 102 is shown with German text. This text represents a set of grammatically agreeing words and interconnected sentences, so it is reasonable to translate this text with an implementation of machine translation. FIG. 1D shows the result of machine translation in English where the translation shown is a true and accurate translation of the German text shown in FIG. 1C. The translation in English is shown upon detection or performing of a swiping action 108 such as with a finger. A picture element 110 (e.g., picture of a muffin) is not modified and is persisted from a first language or source display to a second language or target language or display.

Figure 2:
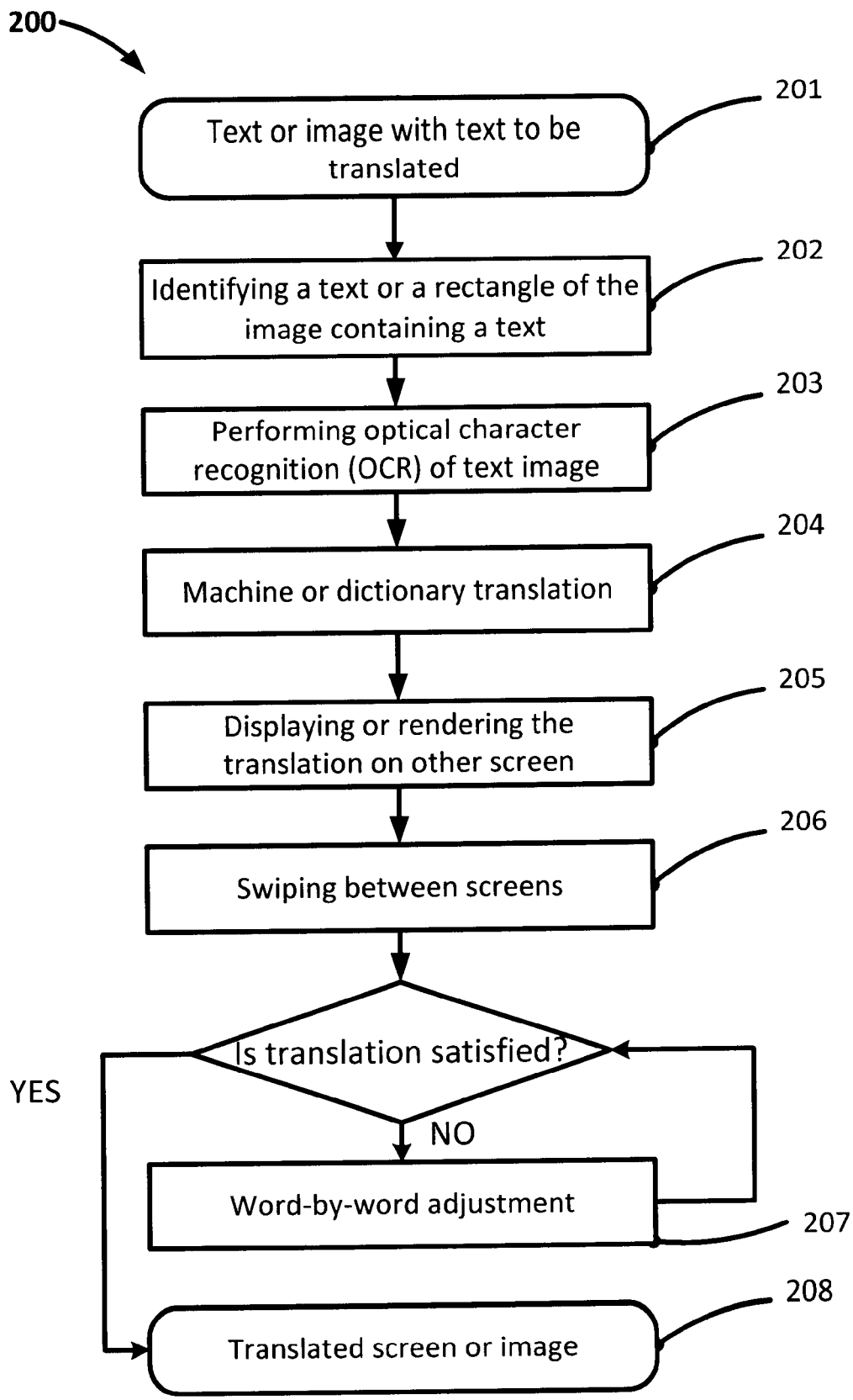
FIG. 2 shows a flowchart of operations performed, for example by software, in accordance with an embodiment of the present disclosure concerned with translation.

Referring now to FIG. 2, there is shown a flowchart 200 of operations performed by a translation application in accordance with one embodiment of the invention.

The process 201 is responsible for receiving and displaying a text or textual image on a screen of electronic device. For example, it may be a photograph, portable document format (PDF) file, or word processor file. After receiving the image with the text to be translated, the disclosed method is activated. In one embodiment the translation can start by detecting a pressing of a button of a camera or camera application to initiate and capture a photograph or image with text or by detecting a first swiping motion (108) in relation to an existing or original image.

At first, the software application identifies a text or at least one rectangle in an image that includes a text 202.

An optical character recognition (OCR) software 203 is applied to the identified region in the image with text. The result of the OCR is a word, word combination, sentence or longer passage of text represented by a string of characters. At the OCR step 203, morphology dictionaries may also be used as higher OCR accuracy and error correction is often achieved by comparing the recognition results with similar word forms in one or more morphology dictionaries. At least one of a machine translation or dictionary translation is performed 204. The output language of translation may be preliminary selected or configured through a selection of a target language in a software application.

Also, the dictionary or set of dictionaries may be preliminarily selected by the user or may be programmatically or automatically made available or selected based on one or more words that are successfully recognized or translated. For example, if an initial OCR operation encounters or recognizes a Russian word, the software application may assign the source language as Russian, and the target language as another language other than Russian. Dictionary software may use, by default, one or more dictionaries or a user may specify one or more desired dictionaries. A default dictionary on a given subject may be selected if the dictionary software determines that the text belongs to a specialized subject (e.g., medicine, law, automobiles, computers).

Additionally, the electronic dictionary may include a morphology module, so that the query word or word combination need not be in a base, or "dictionary" form—the morphology module identifies the base form of an inflected form. If more than one base form is possible, the morphology module identifies possible alternatives. Also, in some cases, the morphology module may determine a grammatical form of the source word, for example, a number for nouns or form of verbs, to select a proper form for the translation in an output language.

Also the morphology module identifies relevant word forms of variants of translation, for example, in accordance with the form of the translated word in the original sentence such as tense forms of verbs or a noun in a plural form.

The result of translation is displayed on another screen of the electronic device at step 205 or may be queued or rendered onto a virtual screen that is physically not visible until after a swiping motion is detected by the device. A screen or display with translated text (106) follows the screen with the original text (104) on the electronic device by a detecting a swiping action and vice versa (the original text may be re-displayed by a swiping motion in a reverse or opposite direction—e.g., a substantially sideways motion).

At step 206, screens may be switched by swiping to another screen as performed by a user (such as shown by element 106 in FIG. 1).

If a user is not satisfied with the result of translation, such as proposed by a machine or a dictionary translation, a word-by-word or phrase-by-phrase correction or adjustment of translated text may be performed 207 such as with the help of dictionaries.

Figure 3:
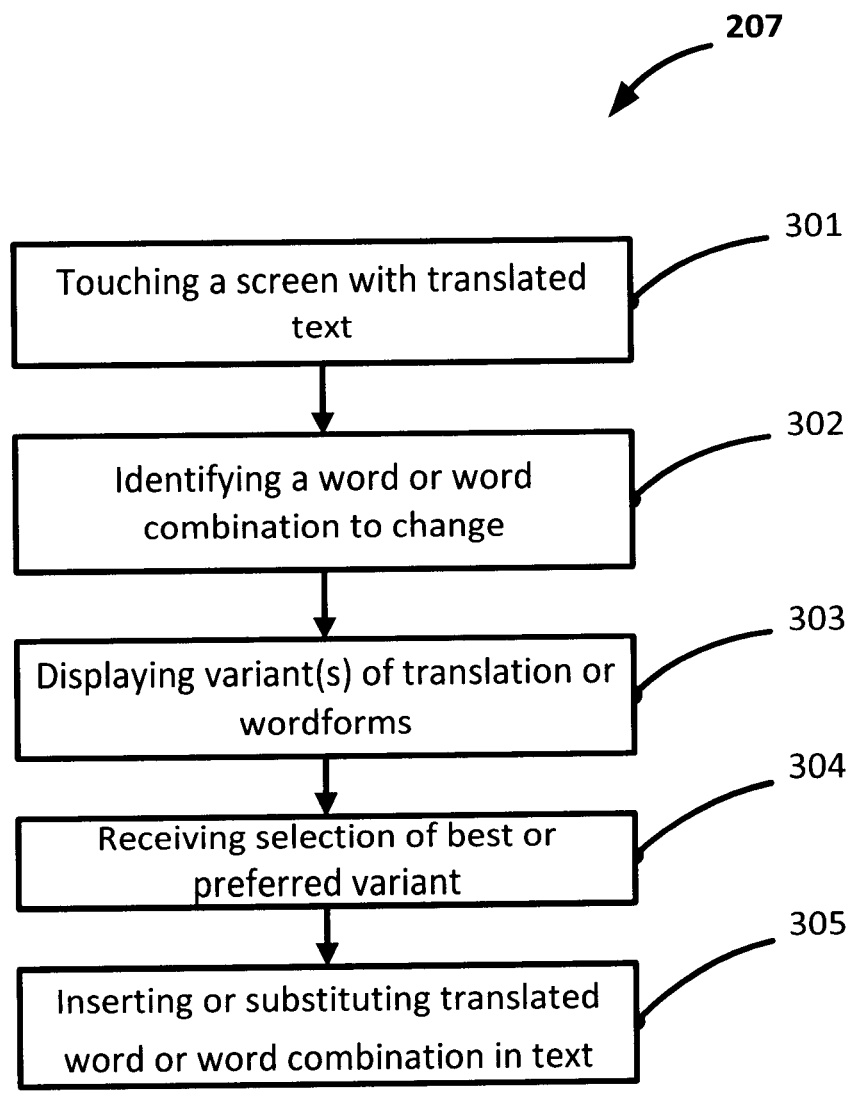
FIG. 3 shows a flowchart of operations performed, for example by software, in accordance with an embodiment of the present disclosure concerned with the method of correction of translated text.

FIG. 3 demonstrates an exemplary flowchart of this process 207 and it is generally optional in combination with translation initiated by a swiping motion.

The output is a display or screen with a translation 208 of the original text. The translated text may be put over the same background. For this result, the characters or letters of the original text may be removed, and the place of their location may be painted or filled with the color of surrounding background to make the background appear substantially similar to the original background. After that, the translated text is put on the new background. Or, the translated text may be displayed without the original background. This variation may be set so that a background may be rendered or not by default when a translation is shown.

Referring now to FIG. 3, there is shown a flowchart of operations performed by the application in accordance with a word-by-word or phrase-by-phrase adjustment 207 of a translated text. When the user swipes between screens and reads a translated text on the display screen 106 of the electronic device 102 and wishes to look up other variants of translation of a particular or desired word or word combination or to correct the translation, the user simply points to the word or word combination with a touch on the corresponding region on the display screen 106 with a finger, a stylus or other suitable object or activation mechanism provided by a software application or operating system.

Referring to FIG. 3, the steps of adjustment involve a touch 301, which initiates a process that enables the user to see a list of alternative variants of translation for a word or word combination or an abridged dictionary entry with other variants of translation. The electronic device takes advantage of its touch screen's ability to establish a position of the touch or gesture to identify a word or word combination to possibly change. This step may be done through use of absolute coordinates, coordinates generated as part of parsing or recognition of the source text, or coordinates generated as part of the translation process relative to the newly produced text in the target language. The position or positions are matched against the image or text on the screen. Various techniques can determine coordinates corresponding to the touching and these techniques may be very different depending on the type of touch screen of the electronic device; the type of touch screen may be resistive, matrix, capacitive, based on surface acoustic waves, infrared, optical imaging, based on dispersive signal technology or based on acoustic pulse recognition, to name a few. In another embodiment the touch screen may have a program interface, and the software application involved in the translating may receive coordinates corresponding to the touching directly from the touch screen through the program interface, through the operating system of the device or through some other mechanism. The coordinates corresponding to particular text in the image may be detected and stored during one or more steps of the OCR processing and may be used to identify either a portion of the source text or of the target language text.

After acquiring relevant coordinates, the method involves determining whether the corresponding point or region is in a text area. If the coordinates correspond to a text area, the word region is identified (302). A word region may contain one word or a word combination. The identified word or word combination is then passed as a query to the dictionary or relevant dictionary functionality.

At step 303, by touching on a word or word combination, several alternative variants of translation of the word or word combination may be displayed on the screen 106 of the electronic device 102. Variants of translation may be displayed in a dropdown list, in a balloon, in a pop-up window, as a subscript, or in any other suitable manner.

At step 304, the desired variant of translation may be chosen by, for example, touching it, touching near it, tapping on or near it, or other suitable mechanism. Manual input (typing) of an appropriate variant (that is not displayed in the list) may be performed by the user in case of the absence in the list of proposed variants for a variant that a user considers the appropriate one.

Next, at step 305, a desired variant of translation is inserted in the translation (target language text). In this way, an updated translation is shown on the display of the hardware device. Variants for a word or word combination in the source text may also be generated and displayed. In this situation, a user can modify the source text, and then making a swiping motion or gesture to receive or view a new result of translation based upon the change to the source text.

In the example shown in FIG. 1A, a menu is to be translated from German into English. After receiving the image of a menu on the screen 102 of an electronic device (for example as a photo from mobile camera), OCR and machine or dictionary translation is performed. The text of the menu is presented as a set of words. A menu may include text without grammatical relations between words so it is reasonable to translate this type of text (the menu text) with a dictionary translation technique. One benefit of a dictionary translation technique includes the use of considerably fewer resources and less time to complete the translation task in comparison with machine translation in this type of translation task, and the dictionary translation may be performed without access to a resource available over an Internet network or protocol.

As shown in FIG. 1B the result of a dictionary translation is displayed on the other rendering to the screen 106 of the electronic device 102. A system user can swipe 108 between two "screens" or renderings and can compare the translated text with the original one with a single motion or with a single hand. Replacement of an entire screen of text may be particularly effective in some situations since, for example, a line-by-line alternating translation (e.g., one line in German followed by a second line in English) may not be easily performed on a relatively small screen such as a screen of a mobile phone or smart phone.

As shown in FIGS. 1A, 1B, 4A, 4B the translated text may be put over the source background with a preliminary painting of the original text on it.

In some cases, translation is carried out not properly or it is more useful to leave the word or the word combination without translation (in a first source language) because during translation the word or word combination can lose its original sense, for example, text associated with names and titles. Moreover, a word or word combination can have several equally valid meanings and therefore a translation may have several variants of translation into another language. Therefore, it is more reasonable in some circumstances to render a translation and retain some of the words in a first or original language and then to give a user a choice of variants of translation from the subject area corresponding to a context. So, to avoid at least the above listed shortcomings, the disclosed invention allows a user to make corrections in a translated text through a user interface and related mechanisms such as the ones shown in FIG. 4A and FIG. 4B.

If the user is not satisfied with the quality of a machine or dictionary translation, a user can manually make adjustments in a translated text. For example, as in FIG. 4A, a dictionary translation offers a version of translation of the plural German noun "raspeln" into the English language as the noun "shavings." The version of the translation "shavings" is not appropriate in a context of a recipe. Therefore, it is more intelligent (linguistically correct) to replace the translation offered by a translation system for another variant of translation from a dictionary with a subject domain of cooking. For this purpose, a user touches the desired word "shavings" on a screen, such as through drop-down list (402) with available variants of translation of the original noun "raspeln" shown: shavings; grates; chips; rasps; rattles. One can choose by a touch, another swipe gesture, or other mechanism or actuation the most suitable translation for this context from the proposed variants. If there is no suitable variant among the shown variants of translation, one can get (404) the complete list of translation variants of this word, by making another gesture or actuation on the electronic device, if initially not all variants are offered.

The most appropriate variant of translation in the example is arguably the noun "rasps." So by touching on the display on or near this variant, a system user can insert a word in the translated text instead of taking the word or variant initially proposed by the translation system.

Figure 4A:
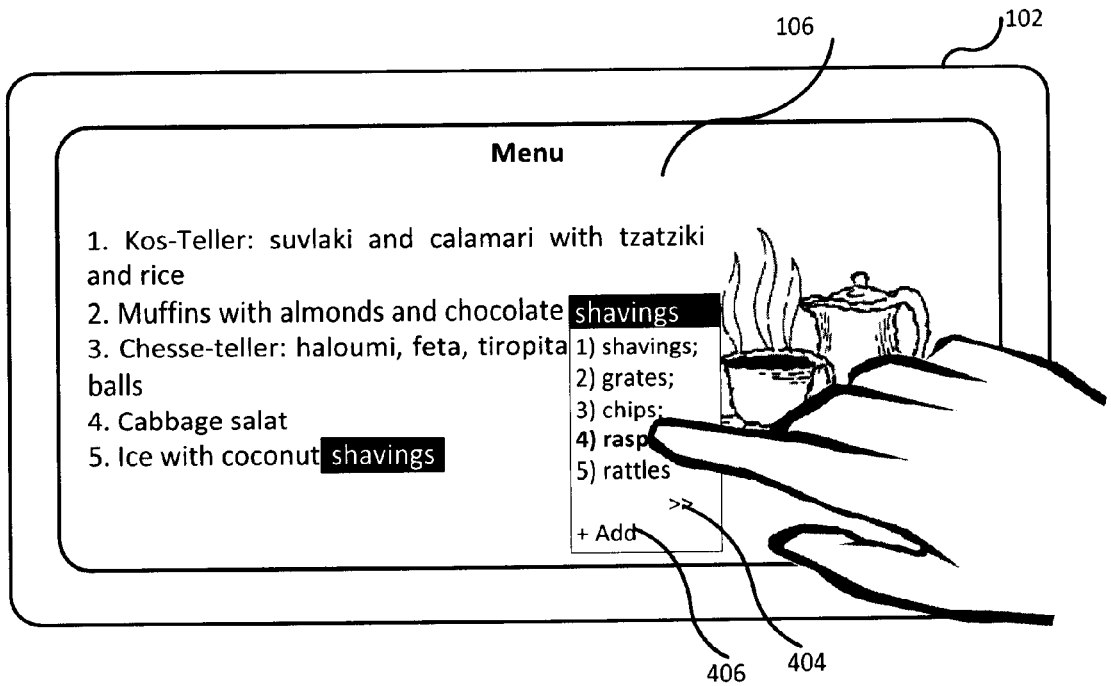
FIG. 4A shows an example of selecting a particular word to be corrected and opening an entry with other possible variants of translation of selected word in output language.
Figure 4B:
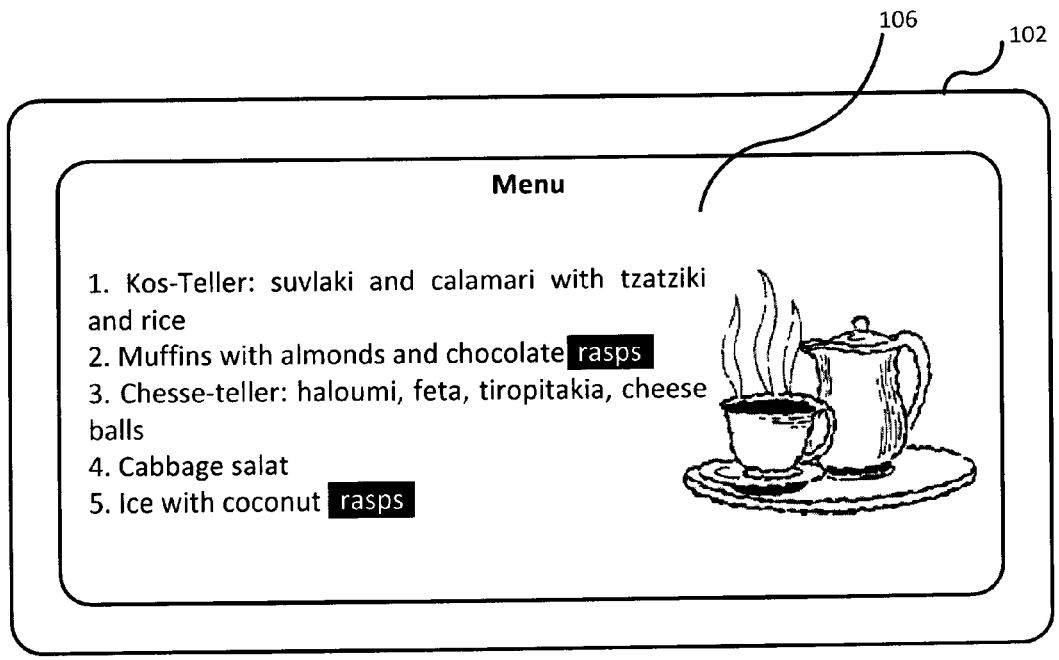
FIG. 4B shows an example of correcting translated text by inserting another more appropriate or desired variant of translation.

Moreover by touching on any word to be corrected, all other variants of its usage in the whole translated text are highlighted. So as shown in FIG. 4A, by touching on the word "shavings" in the second menu item, the noun "shavings" in the sentence "Ice with coconut shavings" is automatically highlighted.

Also, the following option can be specified. By manually correcting any word or word combination in a translated text, the system may propose automatic correction of other identical or similar variants of the same usage in the text. In the above disclosed example, a result of substitution is demonstrated by changing "shavings" to an arguably more appropriate variant of translation, "rasps." These words are highlighted in the text shown in FIG. 4A and FIG. 4B.

In the disclosed invention, during correction of translated text, a user can manually input (e.g., type) the appropriate variant of translation in a case when there are no suitable variants in the list proposed by a dictionary. In one implementation, this option may be performed by touching the button "add" (406), manually typing a variant of translation and inserting it in the translated text. Also, the inputted variants may be stored, for example, in the user dictionary.

In one implementation the system displays not only a translation of a word, but wordforms of the word to be translated, e.g. tense forms of verbs, a noun in plural form, etc.

In our example the word "raspeln" is used in the plural in the text. That is why by touching on "raspeln" in the drop-down list with the following variants of translation from the source German language into the output in the English language are shown and proposed: shavings, grates, chips, rasps, and rattles. As mentioned above, a morphology module may be implemented for this purpose.

For a word being translated or any variant of translation, a reference or calling of an entry with a detailed translation of a word, examples of use, views of a translation from dictionaries of various subjects (e.g. Universal, Computer, Economics, Science, etc.) is possible. For example, a detailed translation may be called by double-touching on the interesting word, or any other manner of opening an entry with a detailed translation may be preliminary specified.

The disclosed method is especially useful for a quick translation of the text image that may be easily loaded in or received by an electronic or mobile device, for example a photo. By swiping the screen, translation of the text on image is performed. The result of this translation may be easily compared with the original text. The disclosed invention is useful in everyday life for example for tourists and students, who can easily and quickly generate a translation of a desired advertisement, newspaper story, title, and text from menus, posters, recipes, etc.

FIG. 5 of the drawings shows hardware 500 that may be used to implement the user electronic device 102 in accordance with one embodiment of the invention. Referring to FIG. 5, the hardware 500 typically includes at least one processor 502 coupled to a memory 504 and having touch screen among output devices 508 which in this case is serves also as an input device 506. The processor 502 may be any commercially available CPU. The processor 502 may represent one or more processors (e.g. microprocessors), and the memory 504 may represent random access memory (RAM) devices comprising a main storage of the hardware 500, as well as any supplemental levels of memory, e.g., cache memories, non-volatile or back-up memories (e.g. programmable or flash memories), read-only memories, etc. In addition, the memory 504 may be considered to include memory storage physically located elsewhere in the hardware 500, e.g. any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 usually includes one or more user input devices 506 (e.g., a keyboard, a mouse, imaging device, scanner, etc.) and a one or more output devices 508 (e.g., a Liquid Crystal Display (LCD) panel, a sound playback device (speaker). To embody the present invention, the hardware 500 must include at least one touch screen device (for example, a touch screen), an interactive whiteboard or any other device which allows the user to interact with a computer by touching areas on the screen. The keyboard is not obligatory in case of embodiment of the present invention.

For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications 516, components, programs, objects, modules, etc. to implement the techniques described above. In particular, the computer software applications will include the client dictionary application and also other installed applications for displaying text and/or text image content such a word processor, dedicated e-book reader etc. in the case of the client user device 102. Moreover, various applications, components, programs, objects, etc., collectively indicated by reference 516 in FIG. 5, may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

I claim:

1. A method comprising:
   displaying an image with original text in a source language on a touch screen of an electronic device;
   displaying a translation of the original text in a target language in response to detection of a first swiping gesture on the touch screen; and
   switching back to displaying the original text in response to detection of a second swiping gesture on the touch screen.

2. The method of claim 1, further comprising acquiring the image with the original text with a camera of the electronic device.

3. The method of claim 2, further comprising recognizing the original text after acquiring the image, wherein the recognition and the translation are performed in response to a triggering action of the camera of the electronic device.

4. The method of claim 1, further comprising acquiring the image with the original text from a memory storage.

5. The method of claim 1, wherein the first swiping gesture and the second swiping gesture comprise a touch movement for a distance along a direction on the touch screen.

6. The method of claim 1, further comprising performing an optical character recognition of the image with the original text in the source language.

7. The method of claim 6, further comprising translating, by the electronic device, the original text directly after recognizing the original text of the image.

8. The method of claim 1, further comprising translating the original text after detection of the first swiping gesture.

9. The method of claim 1, further comprising translating the original text with a dictionary translation.

10. The method of claim 1, further comprising translating the original text includes with a machine translation.

11. The method of claim 1, further comprising manual correction of the translation in the target language when the translation is displayed.

12. The method of claim 11, wherein the manual correction of the translation comprises:
    detecting a first touch on the touch screen when the translation is displayed;
    identifying a portion of the translation corresponding to the first touch;
    displaying one or more alternative variants of translation in the target language of the identified portion of the translation;
    detecting a second touch on the touch screen indicating one of the alternative variants of translation in the target language; and
    substituting the indicated alternative variant of translation for the identified portion of the translation for displaying.

13. The method of claim 12, further comprising accessing a locally-stored dictionary or a remotely-stored dictionary to acquire the one or more alternative variants of translation.

14. The method of claim 13, further comprising performing a morphological analysis on the identified portion of translation to identify a base form of a word.

15. The method of claim 12, wherein word forms of the one or more alternative variants of translation are consistent with a word form of the identified portion of the translation.

16. The method of claim 12, wherein the one or more alternative variants of translation are displayed in the form of a pop-up window, a text balloon, or a pull down menu.

17. The method of claim 12, wherein the identified portion of the translation is a word.

18. The method of claim 12, wherein the identified portion of the translation is a word combination.

19. The method of claim 12, further comprising providing a graphical user interface element that facilitates manual entry of a variant of translation that is not in the displayed one or more alternative variants.

20. The method of claim 12, further comprising:
    highlighting, in the translation, instances of same usage of the identified portion of the translation; and
    substituting the indicated alternative variant of translations for the instances of the same usage in the translation.

21. The method of claim 1, further comprising switching back and forth between displaying the original text and the translation in response to repeated switching between the first swiping gesture and the second swiping gesture for comparing the original text with the translation.

22. The method of claim 1, wherein the first swiping gesture and the second gesture are a left swiping action and a right swiping gesture, an upward swiping action and a downward swiping action, or a clockwise rotation and a counter-clockwise rotation.

23. A method comprising:
    identifying, on a touch screen of an electronic device, a region of an image that includes text in a source language;
    recognizing, by the electronic device, the text of the identified region of the image;
    displaying a translation of the text in the identified region in a target language in response to detection of a first swiping gesture on the touch screen; and
    displaying a re-translation of the translation in the target language back in the source language in response to a second swiping gesture on the touch screen.

24. The method of claim 23, wherein the second swiping gesture is of a type distinct from the first swiping gesture.

25. The method of claim 23, wherein the second swiping gesture comprises two points of contact with the touch screen.

26. An electronic device comprising:
    a touch screen; and
    a processor, wherein the process is configured to:
        display an image with original text in a source language on the touch screen;

display a translation of the original text in a target language in response to detection of a first swiping gesture on the touch screen; and switching back to displaying the original text in response to detection of a second swiping gesture on the touch screen.

27. A non-transitory computer-readable medium storing instructions which, when executed by an electronic device, cause the electronic device to:

display an image with original text in a source language on a touch screen of the electronic device;

display a translation of the original text in a target language in response to detection of a first swiping gesture on the touch screen; and switch back to displaying the original text in response to detection of a second swiping gesture on the touch screen.

* * * * *